(12) United States Patent
Kadouchi et al.

(10) Patent No.: US 6,984,961 B2
(45) Date of Patent: Jan. 10, 2006

(54) BATTERY ASSEMBLY SYSTEM AND ELECTRIC-MOTOR VEHICLE SYSTEM USING THE SAME

(75) Inventors: Eiji Kadouchi, Toyohashi (JP); Kanji Takada, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/346,614

(22) Filed: Jan. 16, 2003

(65) Prior Publication Data

US 2003/0146737 A1    Aug. 7, 2003

(30) Foreign Application Priority Data

Jan. 17, 2002    (JP) .............................. 2002-008395

(51) Int. Cl.
*H02J 7/00*    (2006.01)

(52) U.S. Cl. .................................................. 320/132

(58) Field of Classification Search ................ 320/132, 320/116, 118, 120, 121, 124, 127; 324/426, 324/427, 429, 430
See application file for complete search history.

(56) References Cited

U.S. PATENT DOCUMENTS 5,886,503 A *  3/1999  McAndrews et al. ....... 320/121
5,998,969 A    12/1999  Tsuji et al.
6,118,253 A *  9/2000  Mukainakano et al. ..... 320/134
6,232,744 B1 * 5/2001  Kawai et al. ............... 320/132
6,373,226 B1 * 4/2002  Itou et al. ................... 320/132
6,608,482 B2 * 8/2003  Sakai et al. ................. 324/426

FOREIGN PATENT DOCUMENTS

| JP | 61-206179 | | 12/1986 |
| JP | 10051906 | * | 7/1996 |
| JP | 8-213055 | | 8/1996 |
| JP | 10-322925 | | 12/1998 |

* cited by examiner

*Primary Examiner*—Pia Tibbits
(74) *Attorney, Agent, or Firm*—Hamre, Schumann, Mueller & Larson, P.C.

(57) ABSTRACT

The battery assembly system 100 includes a battery assembly including a plurality of storage batteries C1 to Cn connected in series, a voltage detector 3 for detecting respectively voltages generated in the storage batteries, a current detector 4 for detecting a current flowing in the plurality of storage batteries, a state-of-charge (SOC) calculator 2 for calculating the state of charge (SOC) of the storage batteries, respectively, based on the voltages detected respectively by the voltage detectors 3 and the current detected by the current detector 4, and a charging/discharging unit 1 for charging or discharging at least one of the plurality of storage batteries so as to equalize the SOC of the storage batteries calculated respectively by the SOC calculator 2.

9 Claims, 10 Drawing Sheets

Before Equalization

After Equalization

Before Equalization

Before Equalization

After Equalization

BATTERY ASSEMBLY SYSTEM AND ELECTRIC-MOTOR VEHICLE SYSTEM USING THE SAME

BACKGROUND OF THE INVENTION

1. Field of the Invention

The present invention relates to a battery assembly system for reducing the variations of the state of charge (SOC) of a plurality of storage batteries connected in series and an electric-motor vehicle system using this battery assembly system.

2. Description of the Prior Art

In order to make an effective use of the capacity of a plurality of storage batteries connected in series, a technology for reducing the variations of SOC of the plurality of storage batteries based on a terminal voltage of each of the storage batteries is known. In a conventional technology, a discharging circuit is provided to an individual storage battery one by one, and the storage battery having a high SOC is discharged by the discharging circuit and the SOC thereof is reduced and adjusted to the SOC of the storage battery having a low SOC. Thus, the variations of the SOC are reduced.

For example, JP 61 (1986)-206179A discloses a technology of providing an individual battery with a Zener diode for bypassing a charging current when a terminal voltage of a storage battery reaches a charging termination voltage. JP 08 (1996)-213055A discloses a technology of supplying a current into a by-pass circuit when a terminal voltage of an individual storage battery exceeds the upper-limit voltage. JP 10 (1998)-322925A discloses a technology including detecting the variations of the SOC of a plurality of storage batteries by statistically processing an open circuit voltage of an individual storage battery and reducing the SOC of the storage battery with high SOC by discharging the storage battery with high SOC by the use of a discharging circuit provided to each individual storage battery so as to be adjusted to the SOC of the storage battery with low SOC. Furthermore, conventional technologies judge whether or not an abnormality is present based on the variations of the terminal voltages of the plural of storage batteries.

FIG. 8 is a block diagram showing a configuration of a conventional electric-motor vehicle system 80. The electric-motor vehicle system 80 is a general hybrid electric vehicle. The electric-motor vehicle system 80 is provided with an engine 81. The engine 81 generates power by using gasoline as fuel. The power generated by the engine 81 is transmitted to a motor 92 via a transmission 14 and further transmitted to wheels 15 via a differential gear 16.

To the motor 92, a battery assembly system 90 is connected via an inverter 93. The battery assembly system 90 supplies a discharged electric power to the motor 92 via the inverter 93 in order to assist the power transmitted from the engine 81 to the motor 92 via the transmission 14 at the time of acceleration. The battery assembly system 90 receives the electric power which the motor 92 generates while generating a braking power via the inverter 93 and is charged with the received power at the time of deceleration.

The electric-motor vehicle system 80 is provided with a control ECU 85. The control ECU 85 brings the engine 81 into operation with an optimum fuel efficiency based on a vehicle information such as information about a degree of opening of an accelerator, and the like, information obtained from the engine 81, and information obtained from the battery assembly system 90, and at the same time controls the engine 81 and the inverter 93 in order to prevent the overcharge, overdischarge and overload of the storage battery provided in the battery assembly system 90.

The battery assembly system 90 judges whether the electric-motor vehicle system 80 is running or parking or stopping based on a signal from a control ECU 85. When the electric-motor vehicle system 80 is running, the control ECU 85 controls the engine 81, inverter 93 and motor 92 so that the SOC of storage batteries provided in the battery assembly system 90 is in the range from about 20% to about 80% based on the information from the battery assembly system 90. This is carried out in order to protect the storage batteries provided in the battery assembly system 90 from being overcharged and overdischarged.

FIG. 9 is a block diagram showing a configuration of the battery assembly system 90 provided to a conventional electric-motor vehicle system 80. The battery assembly system 90 is provided with a battery assembly. The battery assembly includes n storage batteries C1, C2, . . . Cn−1 and Cn connected in series (n is an integer of 2 or more). Each of the storage batteries C1, C2, . . . Cn−1 and Cn is formed of lithium (Li) ion secondary battery and its standard capacity is 10 Ah.

The battery assembly system 90 is provided with a resistance discharger 91. The resistance discharger 91 has 7 ohms (Ω) discharging resistance R1, R2, . . . Rn−1, and Rn provided to each of the individual storage batteries C1, C2, . . . Cn−1 and Cn.

The battery assembly system 90 is provided with a voltage detector 82. The voltage detector 82 detects terminal voltages of the storage batteries C1, C2, . . . Cn−1 and Cn, respectively.

The battery assembly system 90 is provided with a multiplexer 95. The multiplexer 95 connects any one terminal of n storage batteries C1, C2, . . . Cn−1 and Cn to the voltage detector 82 in accordance with a switching signal from a battery ECU 86.

The battery assembly system 90 is provided with a current detector 4. The current detector 4 measures voltages at both ends of the resistor SH1 connected in series to n storage batteries in order to detect a current flowing in the storage batteries.

The battery assembly system 90 is provided with a temperature detector 9. The temperature detector 9 detects a temperature of the storage battery by the use of a temperature sensor.

In the thus configured battery assembly system 90, the battery ECU 86 judges whether or not the electric-motor vehicle system 80 is running based on the information from the control ECU 85. When the battery ECU 86 judges that the electric-motor vehicle system 80 is not running, the battery ECU 86 makes the battery assembly system 90 in a dormant state. This is carried out in order to minimize electric power consumption of the battery assembly system 90 by not supplying the battery assembly system 90 with the electric power from the outside when the electric-motor vehicle system 80 is not running.

When the battery ECU 86 judges that the electric-motor vehicle system 80 is running, the ECU 86 switches the multiplexer 95 at high speed of several miliseconds/channel (CH) or less so that the voltage detector 82 detects the terminal voltages of the storage batteries C1, C2, . . . Cn−1 and Cn, respectively. Since the terminal voltage of the storage battery is susceptible to the load fluctuation, the detection of the terminal voltages of the storage batteries C1, C2, . . . Cn−1 and Cn should be finished while the load fluctuation is small, or while the electric-motor vehicle system 80 is stopping. Then, the temperature detector 9 detects temperatures of the storage battery at an appropriate period.

Next, the battery ECU 86 outputs charging request, discharging request, charging permission, or discharging permission to the control ECU 85 based on the terminal voltage of each of the storage batteries C1, C2, . . . Cn−1 and Cn detected by the voltage detector 82. The discharging permission is limited by a storage battery having the lowest terminal voltage, that is, a storage battery having the lowest SOC. The charging permission is limited by a storage battery having the highest terminal voltage, that is, a storage battery having the highest SOC. The battery ECU 86 is operated by a driving electric power supplied from each of the storage batteries C1, C2, . . . Cn−1 and Cn.

FIG. 10 is a graph to illustrate the relationship between the variations of the SOC and the range of usable SOC of each storage battery provided to the conventional battery assembly system 90. The abscissa shows the SOC of the storage battery; and the ordinate shows a terminal voltage of the storage battery. When the variations 17 of the individual storage batteries constituting the battery assembly are expanded to the variations 18, the interval 19 between the SOC in the state of the charging permission and the SOC in the state of the discharging permission is reduced to the interval 20. Therefore, the capacity of the battery assembly that can be used as the battery assembly system is reduced. That is, the region capable of charging/discharging storage battery is reduced.

The SOC shows 50%±20% normal distribution. In order to avoid the above-mentioned situation, the battery ECU 86 controls switches provided between resisters R1, R2, . . . and Rn and storage batteries C1, C2, . . . and Cn, respectively, and equalizes the terminal voltages of the storage batteries. Thus, the SOC of the storage battery can be equalized. As a result, the capacity that can be used as the battery assembly is restored.

Specifically, the battery ECU 86 appropriately turns the switches connected respectively to the resisters R1, R2, . . . and Rn ON based on the terminal voltages of each of the storage batteries C1, C2, . . . and Cn detected by the voltage detector 82. However, the switch connected to the storage battery having the minimum terminal voltage is not turned on.

Then, the detection of the terminal voltage of each storage battery continues. In order to stop the discharge of the storage battery whose terminal voltage is equal to the minimum terminal voltage, the switch connected to the storage battery is turned OFF. When the discharge is stopped, since the polarization by discharge is dissolved, the terminal voltage is increased. Then, the switch connected to the storage battery is turned ON again.

FIG. 11 is a graph showing a distribution of the SOC of storage batteries before being equalized by the resistance discharger 91 provided for the conventional battery assembly system 90. FIG. 12 is a graph showing the distribution of the SOC after being equalized. By repeating the above-mentioned operations, the terminal voltage of the storage batteries is converged from the voltage having the variations shown in FIG. 11 to the minimum terminal voltage shown in FIG. 12.

In this conventional technology, the discharge current is set to be about 1/50C. Even if the vehicle is operated for only about an hour a week, the discharge current of 1/50C is able to correct a shift in battery capacity that normally is seen in the course of one year. The equalization ability of this level is necessary from the conventional actual result in the market.

However, since the above-mentioned switching element provided to the resister discharging circuit for equalization requires the leakage current of several tens of micro amperes (μA) or less and the control current of about the level of several hundred milli amperes (mA), the switching element is expensive. Furthermore, it is also necessary to wire the switching element with the discharge resistor and the storage battery.

Furthermore, in the above-mentioned conventional configuration, since it is necessary to provide a discharging resistor for each storage battery, the configuration of the circuit of the assembly battery system becomes complicated, and the size is increased. Therefore, there is a problem that the cost of the battery assembly system is increased.

Furthermore, since the SOC is equalized by discharging the storage battery having high SOC so as to become the same SOC as that of the storage battery having the minimum SOC, it is necessary to discharge a large amount of electricity with respect to the battery assembly as a whole. Therefore, there is a problem that an energy loss is large.

Furthermore, in the method for bypassing the discharging current during charging, the period in which a discharger can be driven is limited, and it is necessary to provide a large size discharger capable of flowing the discharge current of 1/50C or more. The capacity of the discharging storage battery is about 10 Ah and in this case, the discharging current becomes 0.5 amperes (A) or more. Therefore, there is a problem that the discharging current of the discharger becomes larger, and it is necessary to provide a large-size current element in order to turn a large current ON/OFF.

Furthermore, in the method of discharging the storage battery having high terminal voltage by connecting a resister, and opening the connection when the voltage is the same, it is necessary to repeat turning the discharge ON/OFF many times so that the SOC becomes the same. Therefore, there is a problem that it takes a long time to equalize the SOC.

Furthermore, in the conventional configuration, if the electric motor vehicle system parks for a long time, a part of the storage batteries self-discharge. As a result, there is a problem that if the other batteries are discharged so as to be adjusted to the storage battery that is largely self-discharged, the other batteries are subjected to deep discharge, making it difficult to equalize the SOC.

Furthermore, a deteriorated storage battery in the short-circuit mode may be one of the causes for expanding the variations of the SOC. When the deterioration of the storage battery advances, the variation of the SOC is expanded at higher speed than at the speed of the ability of the SOC equalization circuit. Although the method for detecting the deteriorated battery due to the variations of the terminal voltage of the storage battery has been proposed, the variations of the terminal voltage are reduced by such a current by-pass circuit and the deteriorated battery cannot be detected until the deterioration is quite advanced. Therefore, there is a problem that it is difficult to secure the battery assembly system.

It is an object of the present invention to provide a battery assembly system capable of equalizing the SOC of the battery assembly by a simple configuration and an electric motor vehicle system using the same.

SUMMARY OF THE INVENTION

The battery assembly system according to the present invention includes a battery assembly including a plurality of storage batteries connected in series, a voltage detector for detecting respectively voltages generated in the storage batteries constituting the battery assembly, a current detector for detecting a current flowing in the plurality of storage batteries, a state-of-charge (SOC) calculator for calculating the state of charge (SOC) of the storage batteries, respectively, based on the voltages detected by the voltage detectors, respectively and the current detected by the current detector, and a charging/discharging unit for charging or discharging at least one of the plurality of storage batteries so as to equalize the SOC of the storage batteries calculated by the SOC calculator, respectively.

The electric-motor vehicle according to the present invention includes a battery assembly system according to the present invention, an engine for generating power to be transmitted to wheels, a motor provided for assisting the power generated by the engine to be transmitted to the wheels at the time of acceleration of the engine, and an inverter for supplying the motor with electric power obtained by discharging the battery assembly of the battery assembly system at the time of acceleration of the engine.

DESCRIPTION OF THE PREFERRED EMBODIMENTS

Figure 1:
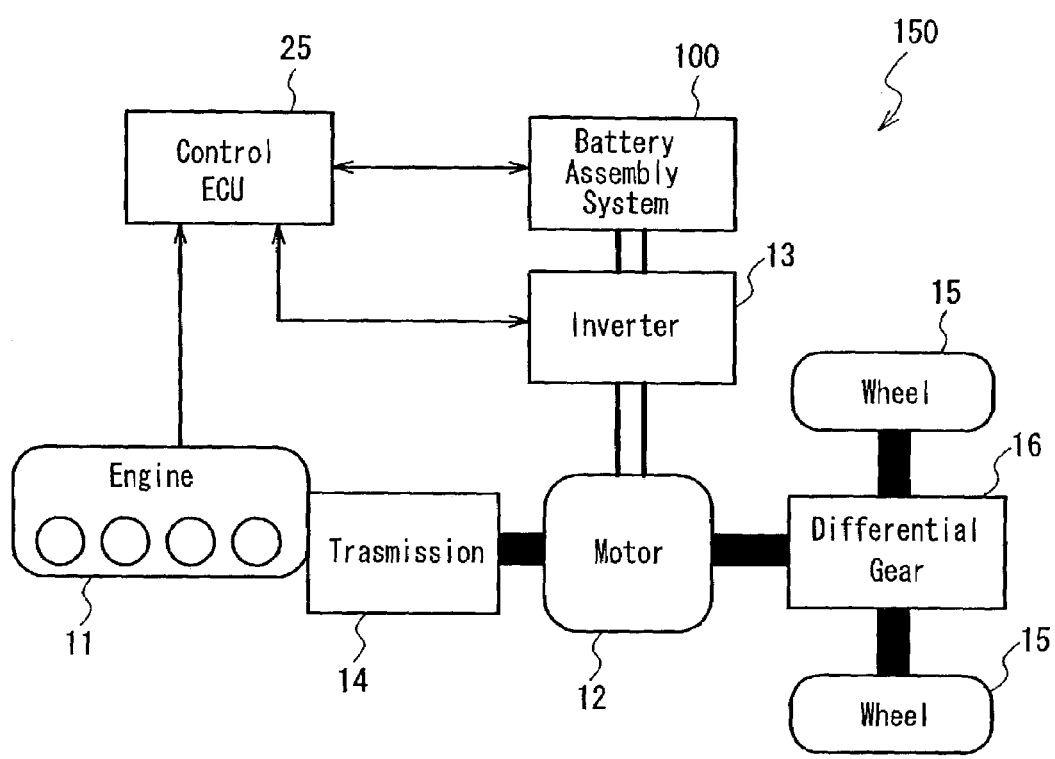
FIG. 1 is a block diagram showing a configuration of an electric motor vehicle system according to one embodiment of the present invention.

In the battery assembly system of the embodiment of the present invention, in order to equalize the SOC of the storage batteries calculated by the SOC calculator respectively, at least one of the plurality of storage batteries is charged or discharged. Therefore, it is possible to equalize the SOC of the storage batteries by a simple charging/discharging unit. As a result, it is possible to equalize the SOC of each storage battery by a simple and inexpensive configuration.

It is preferable that the battery assembly system further includes a multiplexer for connecting any one of the plurality of storage batteries to the voltage detector.

It is preferable that the voltage detector detects a voltage of each storage battery by switching the multiplexer in succession.

It is preferable that the multiplexer connects any one of the plurality of storage batteries to the charging/discharging unit.

It is preferable that the charging/discharging unit charges or discharges each storage battery by switching the multiplexer in succession.

It is preferable that the battery assembly system further includes a deviation judging unit for judging whether or not the maximum value of the deviation of the SOC of each storage battery calculated by the SOC calculator exceeds the predetermined value. When the deviation judging unit judges that the maximum value of the deviation of the SOC of each storage battery exceeds the predetermined value, the charging/discharging unit charges or discharges at least one of the plurality of storage batteries.

It is preferable that the charging/discharging unit charges or discharges a storage battery in which the deviation of the SOC exceeds the predetermined value.

It is preferable that the charging/discharging unit charges a storage battery in which the deviation of the SOC is deviated to the negative side and discharges a storage battery in which the deviation of the SOC is deviated to the positive side.

It is preferable that the predetermined value is 5%.

It is preferable that the deviation is a deviation with respect to the median value of the SOC of the plurality of storage batteries.

It is preferable that the charging/discharging unit has $\frac{1}{100}C$ to $\frac{1}{10000}C$ of charging/discharging capacity with respect to the capacity of the battery assembly.

It is preferable that the battery assembly system further includes a deterioration detector for detecting a storage battery whose performance is deteriorated among the plurality of storage batteries.

It is preferable that the deterioration detector detects the deteriorated storage battery based on the quantity of charged/discharged electricity that is an accumulation of the quantity of electricity for each storage battery being charged or discharged.

It is preferable that the deterioration detector detects the deteriorated storage battery based on an elapsed time until the deviation of the SOC exceeds the predetermined value.

In the electric motor vehicle according to the invention of the present invention, at least one of the plurality of storage batteries is charged or discharged so as to equalize the SOC of the storage batteries calculated respectively by the SOC calculator. Therefore, it is possible to equalize the SOC of the storage batteries by a simple charging/discharging unit. As a result, it is possible to equalize the SOC of each storage battery with a simple and inexpensive configuration.

It is preferable that the motor generates electric power while generating a braking power of the engine at the time of the deceleration of the engine, and the inverter charges the battery assembly with the electric power generated by the motor.

It is preferable that the voltage detector detects the voltages, respectively, while the wheels are moving by the power of the engine.

It is preferable that the electric-motor vehicle system further includes a multiplexer for connecting any one of the plurality of storage batteries to the voltage detector. The voltage detector detects the voltages, respectively, by switching the multiplexer at a high speed of several millisecond/channel or less when the wheels are moving by the power of engine.

It is preferable that the voltage detector finishes detecting voltages of the plurality of storage batteries for such a short time that the load fluctuation of the storage battery falls within 5% or less.

It is preferable that the voltage detector detects the voltages, respectively, when the wheels are stopping.

Hereinafter, the present invention will be explained with reference to drawings.

FIG. 1 is a block diagram showing a configuration of an electric-motor vehicle system 150 according to one embodiment of the present invention. The electric-motor vehicle system 150 is a general hybrid electric vehicle. The electric-motor vehicle system 150 is provided with an engine 11. The engine 11 generates power by using gasoline as fuel, for example. The power generated by the engine 11 is transmitted to a motor 12 via a transmission 14 and further transmitted to wheels 15 via a differential gear 16.

To the motor 12, a battery assembly system 100 is connected via an inverter 13. The battery assembly system 100 supplies a discharged electric power to the motor 12 via the inverter 13 in order to assist the power transmitted from the engine 11 to the motor 12 via the transmission 14 at the time of acceleration. The battery assembly system 100 receives the electric power which the motor 12 generates while generating a braking power via the inverter 13 and is charged with the received power at the time of deceleration.

The electric-motor vehicle system 150 is provided with a control ECU 25. The control ECU 25 brings the engine 11 into operation with an optimum fuel efficiency based on vehicle information such as information about a degree of opening of an accelerator, and the like, information obtained from the engine 11, and information obtained from the battery assembly system 100, and at the same time controls the engine 11 and the inverter 13 in order to prevent the overcharge, overdischarge and overload of the storage battery provided to the battery assembly system 100.

The battery assembly system 100 judges whether the electric-motor vehicle system 150 is running or parking or stopping based on a signal from a control ECU 25. When the electric-motor vehicle system 150 is moving, the control ECU 25 controls the engine 11, inverter 13 and motor 12 so that the SOC of storage batteries provided to the battery assembly system 100 is in the range from about 20% to about 80% based on the information from the battery assembly system 100. This is carried out in order to protect the storage batteries provided to the battery assembly system 100 from being overcharged and overdischarged.

Figure 2:
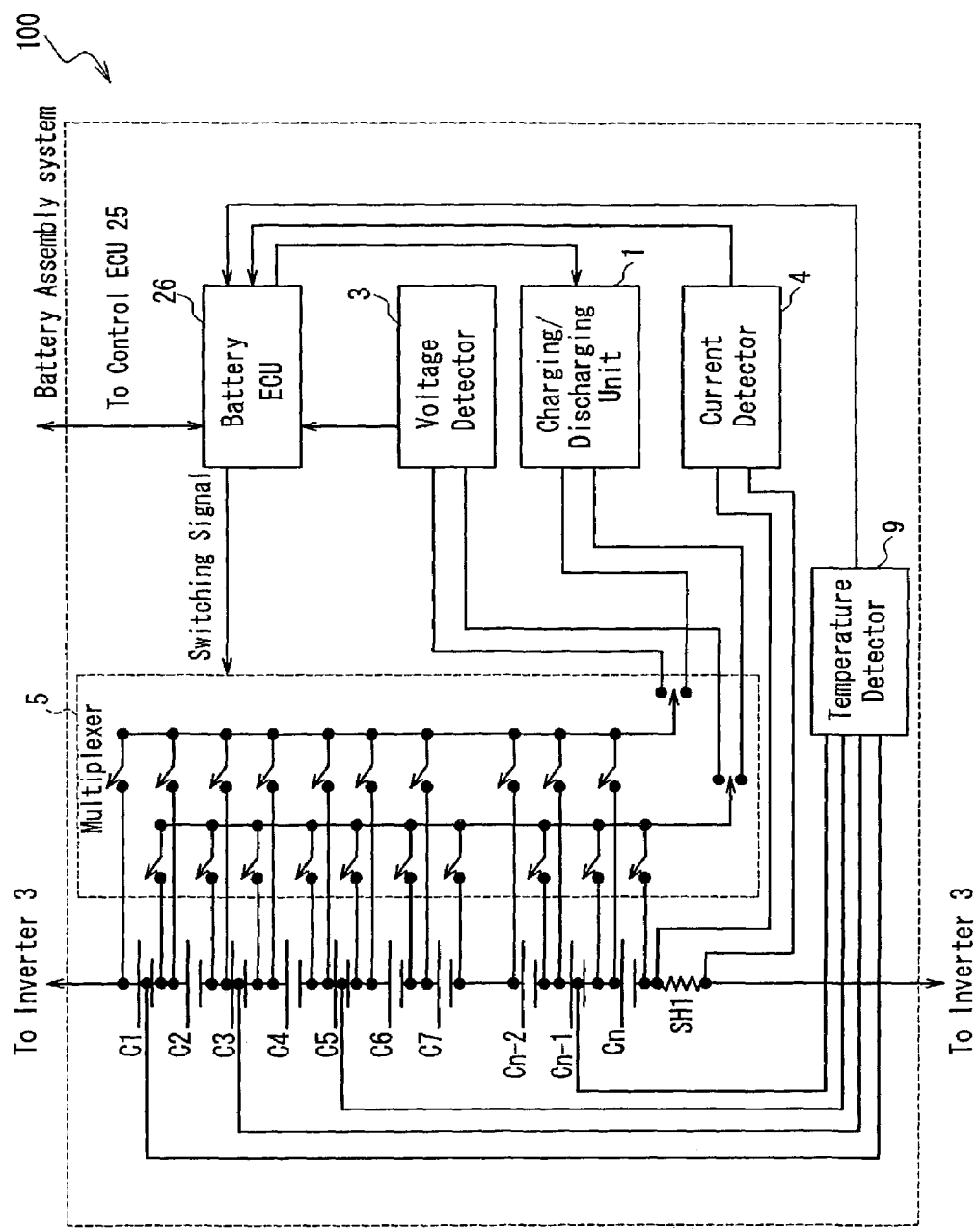
FIG. 2 is a block diagram showing a configuration of a battery assembly system provided for the electric motor vehicle system according to the embodiment.

FIG. 2 is a block diagram showing a configuration of the battery assembly system 100 provided for a conventional electric-motor vehicle system 150. The battery assembly system 100 is provided with a battery assembly. The battery assembly includes n storage batteries C1, C2, . . . Cn−1 and Cn connected in series (n is an integer of 2 or more). Each of the storage batteries C1, C2, . . . Cn−1 and Cn may be formed of lithium (Li) ion secondary battery and its standard capacity is 10 Ah.

The battery assembly system 100 may be provided with a voltage detector 3. The voltage detector 3 detects terminal voltages of the storage batteries C1, C2, . . . Cn−1 and Cn, respectively.

The battery assembly system 100 may be provided with a multiplexer 5. The multiplexer 5 connects any one terminal of n storage batteries C1, C2, . . . Cn−1 and Cn to the voltage detector 3 in accordance with a switching signal from a battery ECU 26.

The battery assembly system 100 may be provided with a current detector 4. The current detector 4 measures voltages at both ends of the resistor SH1 connected in series to n storage batteries in order to detect a current flowing in the storage batteries.

The battery assembly system 100 may be provided with a temperature detector 9. The temperature detector 9 detects a temperature of the storage battery by the use of temperature sensors.

Figure 3:
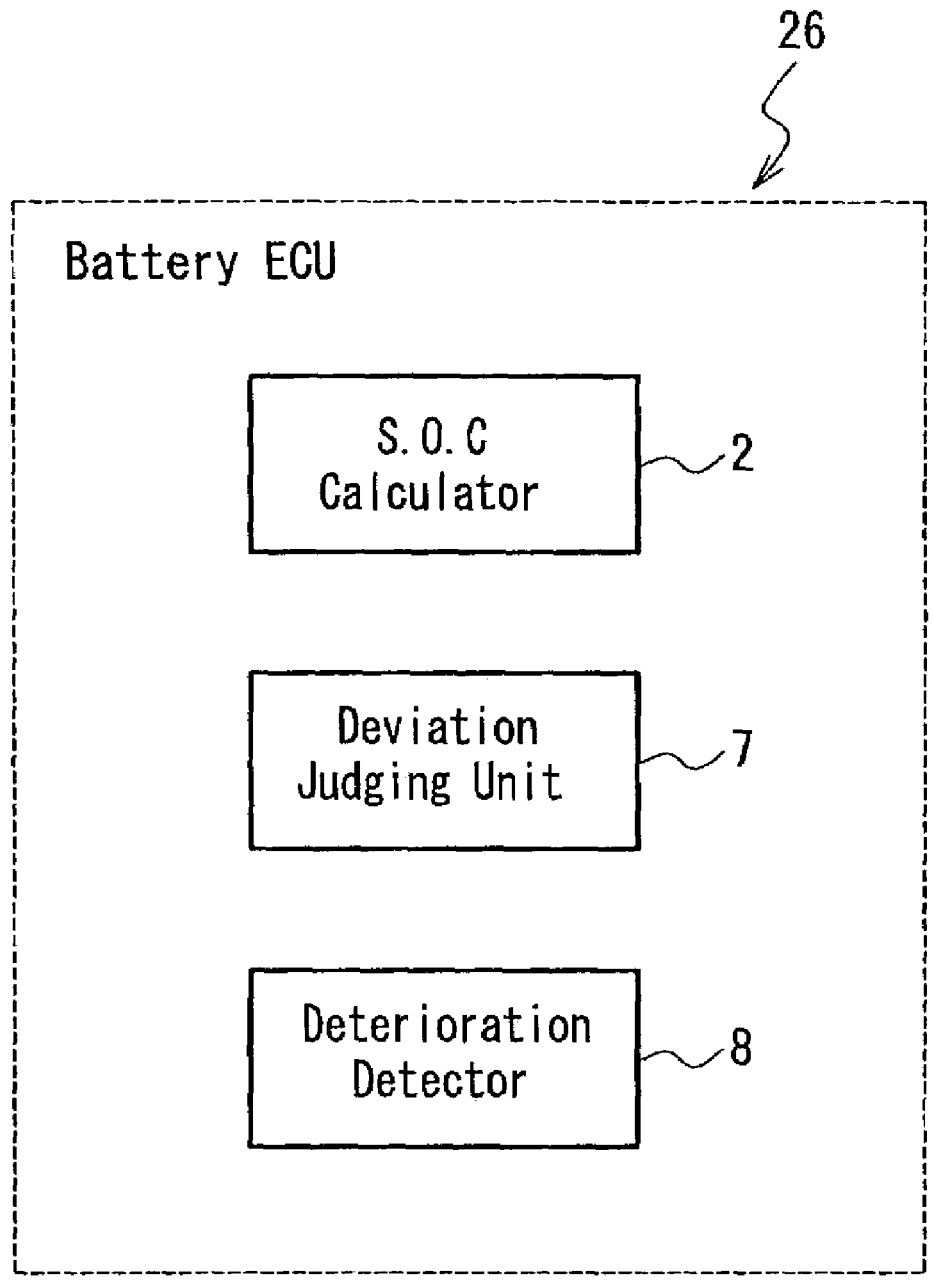
FIG. 3 is a block diagram showing a configuration of a battery ECU provided for the battery assembly system according to the embodiment.

FIG. 3 is a block diagram showing a configuration of the battery ECU 26 provided for the battery assembly system 100. The battery ECU 26 has a SOC calculator 2. The SOC calculator 2 calculates the SOC of the storage batteries based on the terminal voltage of each storage battery detected by the voltage detector 3, respectively and the current detected by the current detector 4.

The battery ECU 26 is provided with a deviation judging unit 7. The deviation judging unit 7 judges whether or not the maximum value of the deviation of the SOC of the storage batteries calculated by the SOC calculator 2 exceeds the predetermined value.

The battery ECU 26 has a deterioration detector 8. The deterioration detector 8 detects a deteriorated battery whose performance is deteriorated.

The battery assembly system 100 is provided with a charging/discharging unit 1. The charging/discharging unit 1 charges or discharges at least one storage battery of n storage batteries when the deviation judging unit 7 judges that the maximum value of the deviation of the SOC of the storage batteries exceeds the predetermined value. The multiplexer 5 connects the charging/discharging unit 1 to one of n storage batteries.

In the thus configured battery assembly system 100, the battery ECU 26 judges whether or not the electric-motor vehicle system 150 is running based on the information from the control ECU 25.

When the battery ECU 26 judges that the electric-motor vehicle system 150 is running, the battery ECU 26 switches the multiplexer 95 at a high speed of several milliseconds/channel (CH) or less so that the voltage detector 3 detects terminal voltages of the storage batteries C1, C2, . . . Cn−1 and Cn, respectively. Since the terminal voltage of the storage battery is susceptible to the load fluctuation, the detection of the terminal voltage of each of the storage batteries C1, C2, . . . Cn−1 and Cn is finished in a short time in which the load fluctuation is about 5% or less. Then, the temperature detector 9 detects temperatures of the storage battery at an appropriate period. Then, the current detector 4 detects the current flowing in each storage battery.

Next, the battery ECU 26 outputs a charging request, discharging request, charging permission, or discharging permission to the control ECU 25 based on the terminal voltage of each of the storage batteries C1, C2, ... Cn−1 and Cn detected by the voltage detector 3.

At the same time of such an operation, an open circuit voltage of each storage battery is calculated. The SOC calculator 2 provided for the battery ECU 26 collects, for one specific example, 60 pairs of data. Each pair of data includes terminal voltage Vc1 to Vcn of the storage batteries C1 to Cn detected by the voltage detector 3 and current I detected by the current detector 4. This one pair of data was detected for a short time in which the load fluctuation became 5% or less.

Then, based on these 60 pairs of data, the open circuit voltage is calculated from the following relationship expression:

$Vck = $(open circuit voltage)−(load current)×(internal resistance of storage battery)

wherein $1 \leq k \leq n$.

Then, the SOC is calculated by substituting the calculated open circuit voltage into the variations V in the following Formula 1.

$$SOC = a + b \cdot V + c \cdot V^2 + d \cdot V^3 + e \cdot V^4 + f \cdot V^5 + g \cdot V^6 \quad \text{(Formula 1)}$$

Herein, a=−176785
b=236490
c=−119198
d=26007
e=−1401.2
f=−308.78, and
g=36.258

Figure 4:
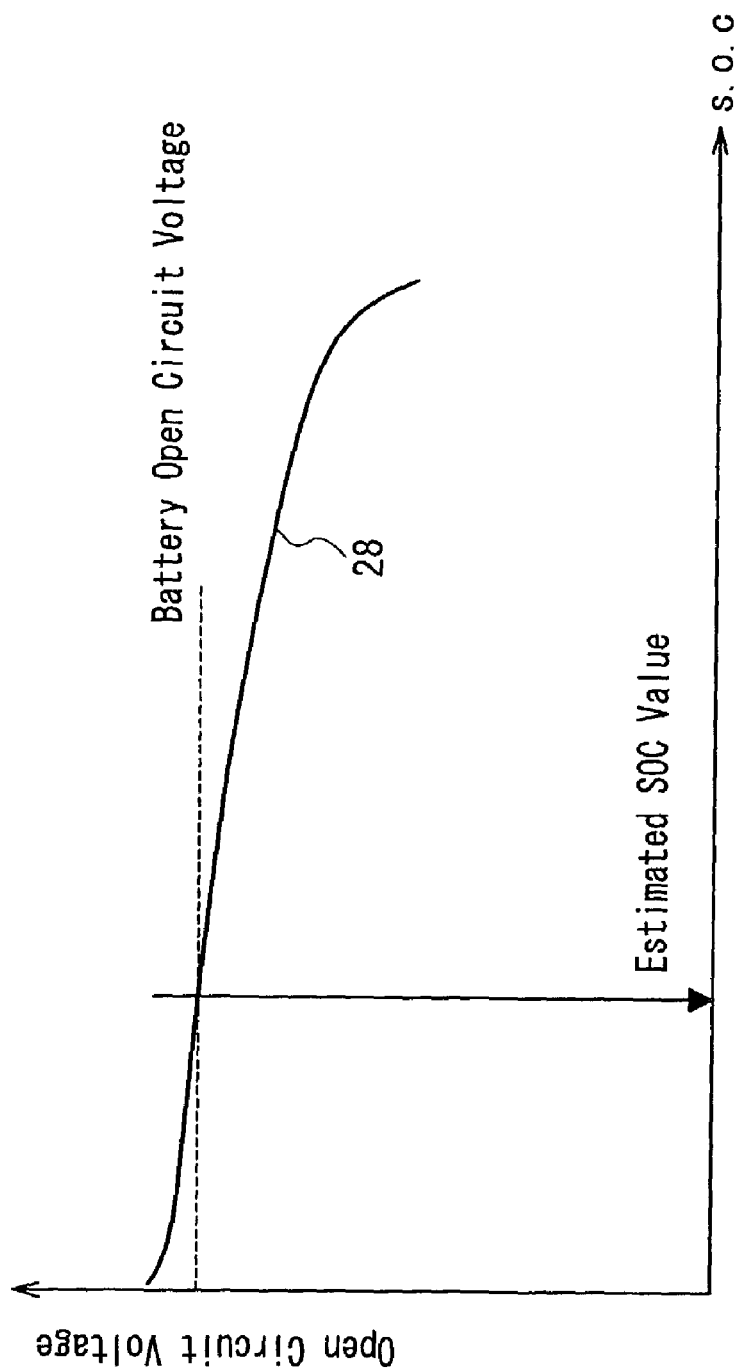
FIG. 4 is a graph to illustrate a method in which a SOC calculator provided for the battery ECU of the battery assembly system estimates the SOC based on a battery open circuit voltage.

FIG. 4 is a graph to illustrate a method in which the SOC calculator 2 provided to the battery ECU 26 estimates the SOC based on the battery open circuit voltage. The abscissa shows the SOC, and the ordinate shows an open circuit voltage. The above formula 1 can be obtained by a curve 28 shown in the graph of FIG. 4.

Next, the deviation of the thus obtained SOC of individual storage batteries is calculated. The calculated deviation is to be a quantity of the charged/discharged electricity. The deviation to be calculated may be a deviation with respect to the average value of the SOC of all the storage batteries and may also be a deviation with respect to the median value of the SOC of all the storage batteries. However, in the case where the distribution shape does not show the normal distribution shape, the deviation with respect to the median value is preferred.

Furthermore, when the SOC is calculated based on the detected terminal voltage of the storage battery, since the battery capacity is changed depending upon the temperature of the storage battery, it is preferable that the terminal voltage of the storage battery is corrected based on the temperature of the storage battery detected by the temperature detector 9.

When it is judged that that the electric-motor vehicle system 150 is not running but stopping or parking, substantially no load current flows in the storage battery. Therefore, the terminal voltage and temperature of the storage battery are measured, and thereby the SOC easily can be calculated based on the above-mentioned formula 1. In this case, unlike the case where the electric-motor vehicle system 150 is running, it is not necessary to measure the terminal voltage for a short time. In general, it is preferable that the terminal voltage and current of the storage battery are measured during stopping or parking, however, when the frequency of the running of the electric motor vehicle system is high, the terminal voltage and the current of the storage battery are measured during running.

Thus, also while the electric motor vehicle system is stopping or parking, it is possible to calculate the deviation of the SOC as during running. Thus, it is possible to improve the operation rate of the function for equalizing the SOC.

Next, the deviation judging unit 7 provided for the battery ECU 26 judges whether or not the maximum value of the deviation of the SOC of each storage battery calculated by the SOC calculator 2 exceeds 5%, that is, the predetermined value. When it is judged that the maximum value of the deviation dose not exceed 5%, that is, the predetermined value, in order to calculate the SOC and the deviation of the SOC of each storage battery, the operation for calculating the terminal voltage and current of each storage battery is continued. This is because when the deviation of the SOC is small, the accuracy of the deviation of the calculated deviation is insufficient, and even if the SOC is equalized, the effect for compressing the variations of the SOC is insufficient. Furthermore, this is because the discharge of the individual storage battery is avoided from the viewpoint of energy loss. Furthermore, this is because if the deviation of the SOC is 5% or less, the decrease in the range of the SOC of the usable storage battery is not so important.

When it is judged that the maximum value of the deviation exceeds 5%, that is, the predetermined value, the SOC of the storage battery is equalized. Concretely, the charging/discharging unit 1 charges a storage battery that is deviated to the negative side and discharges a storage battery that is deviated to the positive side regardless of the vehicle's running or stopping/parking. However, during running, it is also important to monitor the terminal voltage of the storage battery. The storage battery is charged/discharged while appropriately switching the multiplexer 5, so that the terminal voltage of the storage battery is monitored.

The battery ECU 26 stores the deviation of the SOC of each storage battery when the maximum deviation value exceeds 5%, and by switching the multiplexer 5, the predetermined storage battery is direct-connected to the charging/discharging unit 1 and the SOC of the direct-connected storage battery is corrected.

In the case of parking, etc. in which it is not necessary to measure the terminal voltage of the storage battery, the SOC is corrected by successively switching the multiplexer 5 in the order from the storage battery having the largest deviation of the SOC to that having the smallest deviation of the SOC. When the storage battery having the predetermined deviation is corrected, after several hours' pause as the stable time, as mentioned above, the process of detecting the SOC based on the detected voltage and equalizing the SOC is repeated.

In this embodiment, regardless of whether the electric motor vehicle is running or stopping/parking, the above-mentioned process is continued so as to prolong the operation time of the charging/discharging function, thus enabling the performance of the charging/discharging unit to be reduced. In this embodiment, the ability of the charging/discharging unit is about $\frac{1}{200}$C. With this charging/discharging unit, the correction corresponding to about 43C(=$\frac{1}{200}$×24 hours×365 days) is possible for one year. The system voltage in the hybrid electric vehicle as in this embodiment is generally about 240 volts (V), and the number of lithium-ion batteries connected in series is about 80. Therefore, the correction ability corresponding to about 43C mentioned above is about half of that of the prior art, that is, 1C per cell for a year, and 80 cells×1C=80C per battery assembly.

Figure 5:
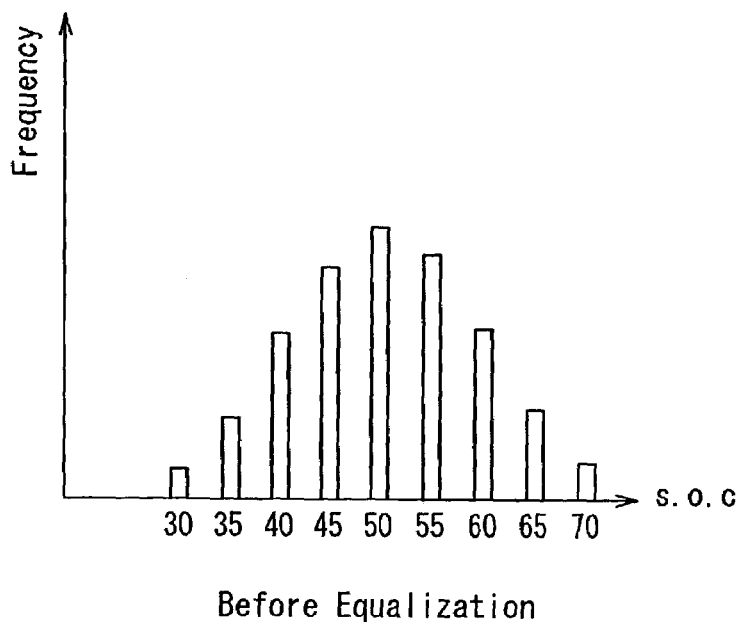
FIG. 5 is a graph to illustrate the distribution of the SOC of each storage battery before being equalized by a charging/discharging unit provided for the battery assembly system according to the embodiment.
Figure 6:
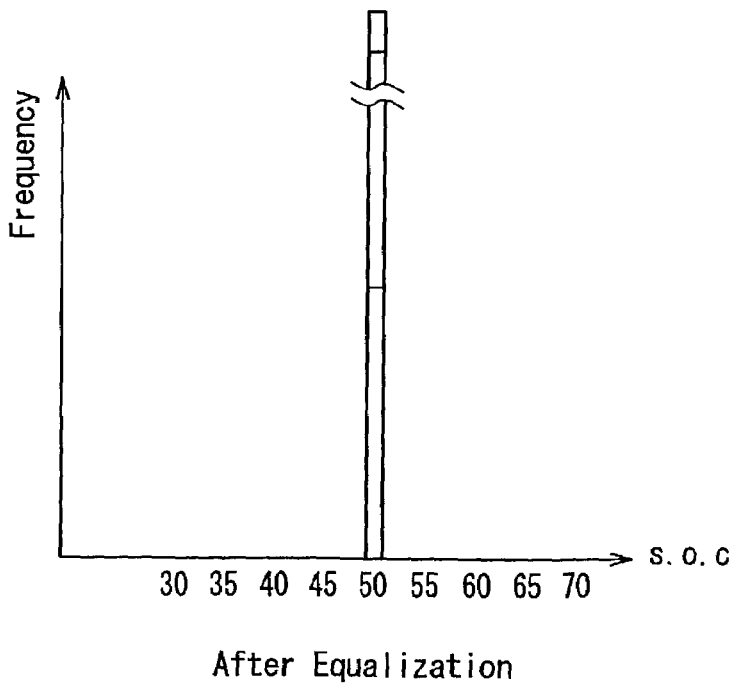
FIG. 6 is a graph to illustrate the distribution of the SOC of each storage battery after being equalized which is provided for the battery assembly system according to the embodiment.
Figure 11:
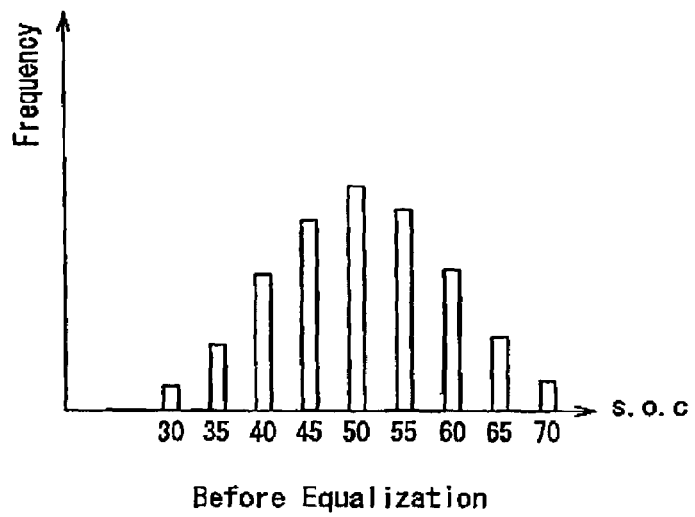
FIG. 11 is a graph showing the distribution of the SOC of storage battery before being equalized by the discharger provided to a battery assembly system of the prior art.
Figure 12:
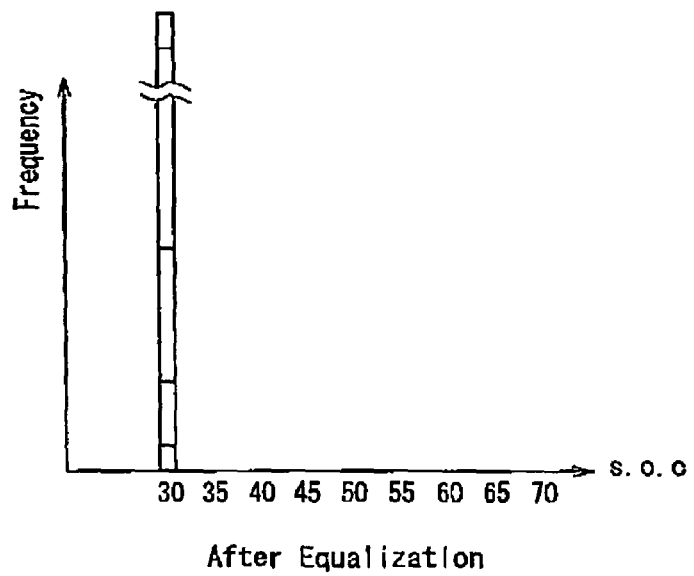
FIG. 12 is a graph showing the distribution of the SOC after being equalized by the discharger provided to a battery assembly system of the prior art.

FIG. 5 is a graph showing a distribution of the SOC of the storage batteries before being equalized by the charging/discharging unit 1 provided to the battery assembly system 100 according to the embodiment; and FIG. 6 is a graph showing a distribution of the SOC of storage batteries after being equalized by the charging/discharging unit 1. As shown in FIGS. 5 and 6, when the SOC of the storage batteries is equalized by charging and discharging, the quantity of charged/discharged electricity is reduced to about one-third of the quantity of discharged electricity only by discharging as shown in FIGS. 11 and 12 described above in the description of the prior art. Therefore, the battery assembly system according to this embodiment secures the equalization ability that is equal to or more than that of the battery assembly system of the prior art.

The storage battery having a large deviation of the SOC are shown significantly in the specific storage battery as shown in the occurrence of the micro short-circuited storage battery. Therefore, the battery assembly system according to this embodiment, which is capable of charging or discharging the specific storage battery selectively, has a higher ability to equalize the SOC than that of the battery assembly system in the prior art.

In the battery assembly system according to the prior art, if the variations of the distribution of the SOC of the storage batteries are deviation of ±20% around 50% as shown in FIGS. 11 and 12, since the SOC is equalized at the minimum SOC (30%), a single storage battery has to be discharged 40% at maximum. On the contrary, in the battery assembly system according to this embodiment having a charging function of this embodiment, the SOC is equalized at 50% that is a median value of the SOC as shown in FIGS. 5 and 6, and the SOC can be equalized with charging/discharging of 20% that is half of 40% mentioned above.

When this embodiment is employed in the SOC having the normal distribution of 50%±20% shown in FIG. 5, the quantity of electricity discharged unnecessarily can be reduced to about ⅙. Therefore, the battery assembly system of this embodiment is effective also from the viewpoint of energy efficiency.

Figure 7:
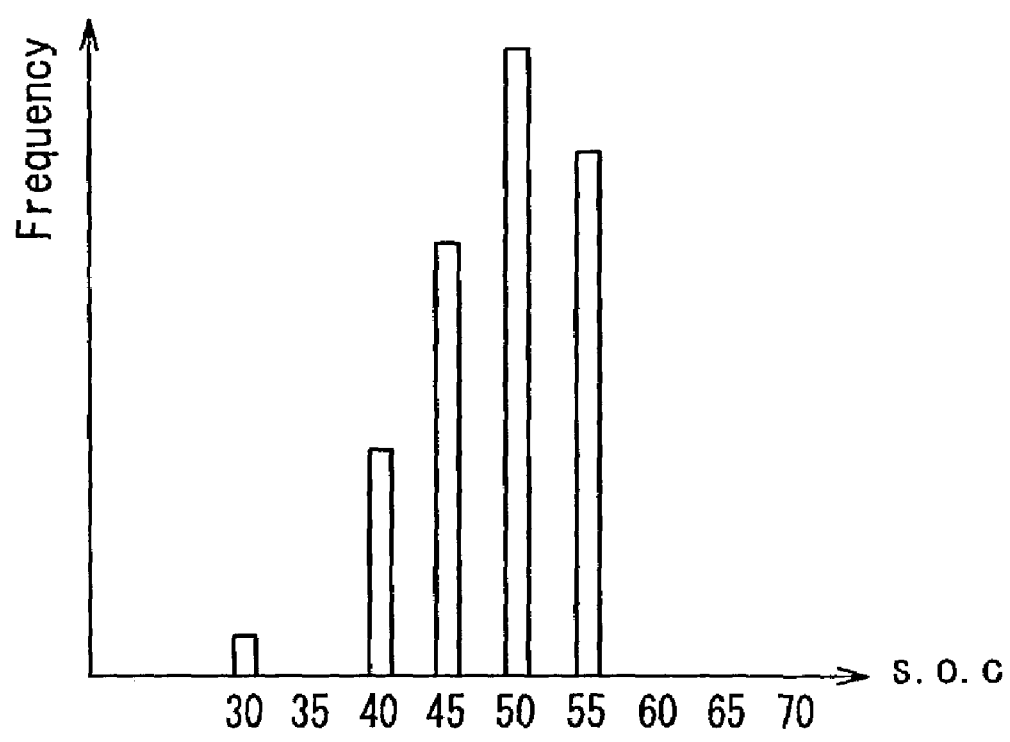
FIG. 7 is a graph to illustrate the distribution of the SOC of each storage battery before equalized by the discharger provided for the battery assembly system according to the embodiment.
Figure 8:
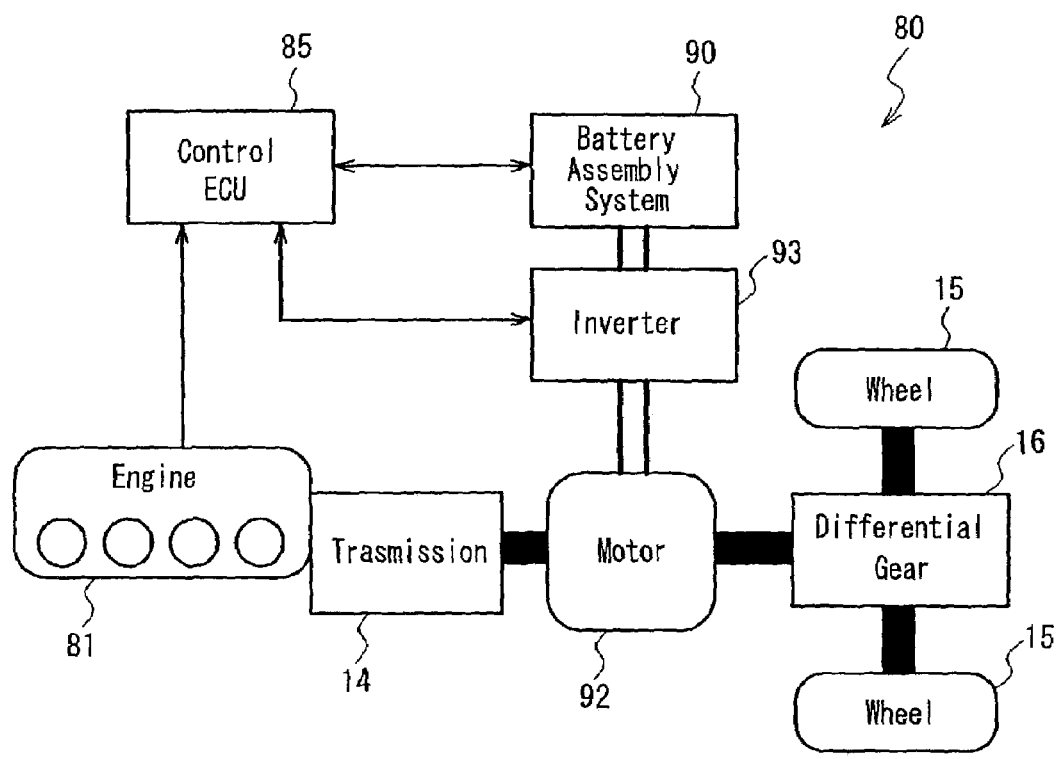
FIG. 8 is a block diagram showing a configuration of an electric motor vehicle system of the prior art.
Figure 9:
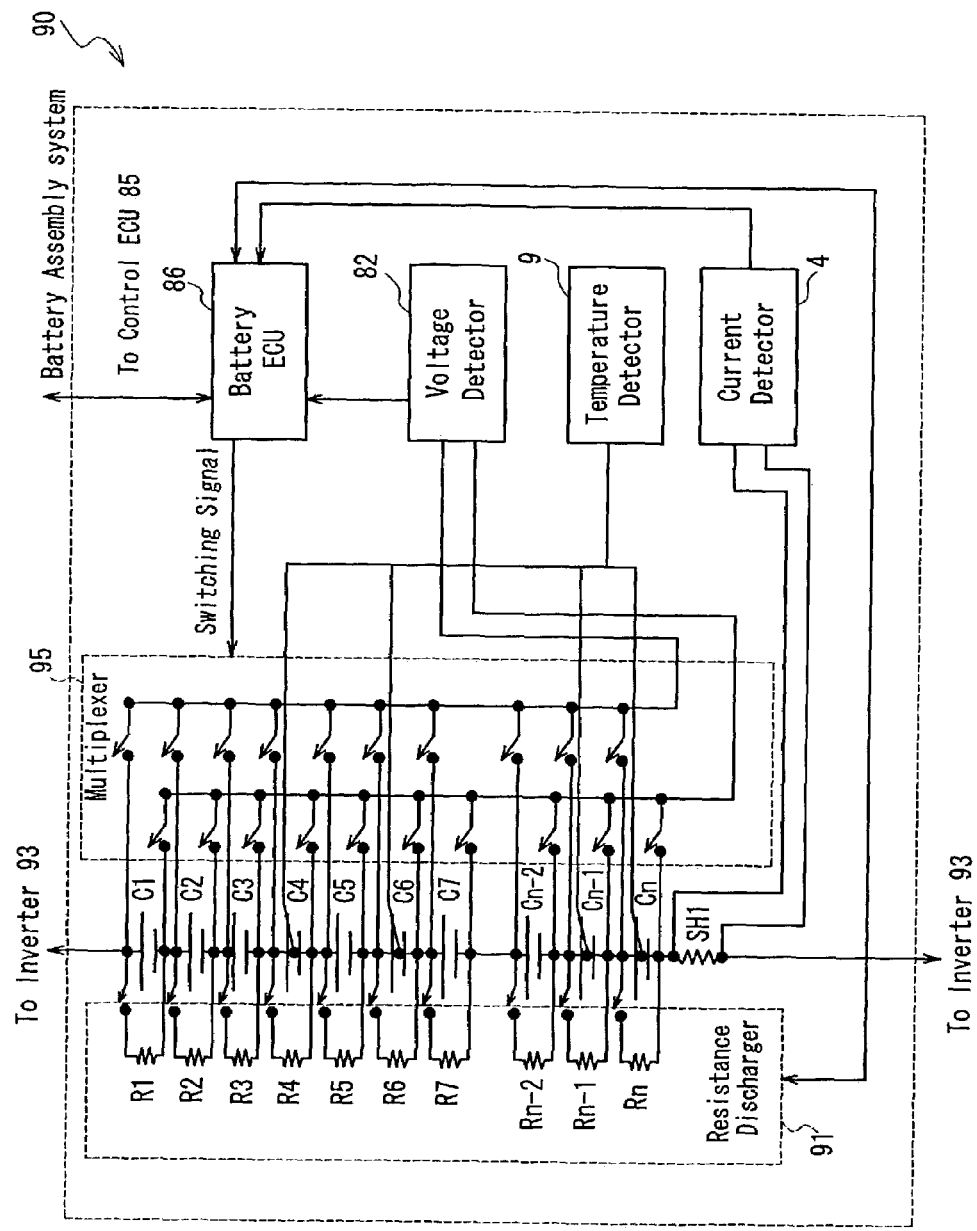
FIG. 9 is a block diagram showing a configuration of a battery assembly provided to the electric motor vehicle system of the prior art.
Figure 10:
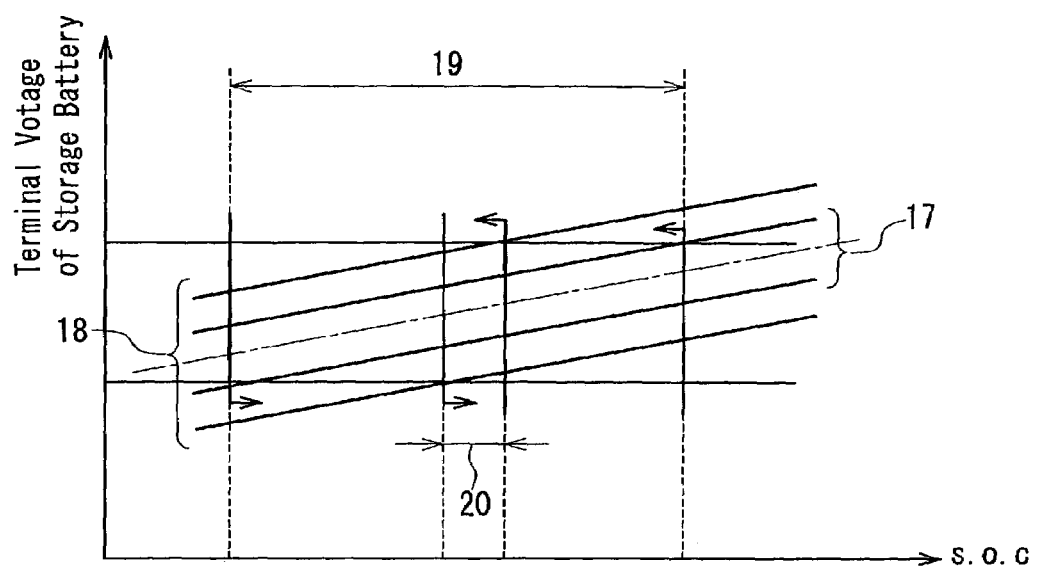
FIG. 10 is a graph to illustrate the relationship between the variations of the SOC and the range of usable SOC of each storage battery provided to a battery assembly system of the prior art.

FIG. 7 is a graph showing the distribution of the SOC of each storage battery before being equalized, which is provided to a hybrid electric vehicle according to this embodiment. The graph of FIG. 7 shows the storage battery in which the SOC is reduced greatly to 30%. In the actual distribution of the SOC of the battery assembly, as shown in FIG. 7, as compared with the other storage batteries, the storage battery in which the SOC is extremely reduced. This is because a small internal short-circuit occurs in one of the storage batteries constituting the battery assembly. According to the battery assembly system of this embodiment, as shown in FIG. 7, when the SOC is distributed, the quantity of charged electricity for equalizing the SOC is reduced significantly as compared with the quantity of discharged electricity for equalization by the battery assembly system according to the prior art.

In the battery assembly system according to this embodiment, as the number of batteries constituting the battery assembly increases, the time necessary for equalization becomes longer. However, this can be suppressed by increasing the multiplexers.

In this battery assembly system of this embodiment, not only during running but also during stopping/parking, it is possible to detect the terminal voltage of the storage battery and to equalize the SOC. This is because in the electric motor vehicle system incorporating a battery assembly system, the sopping/parking time is longer than the running time.

In the conventional battery assembly system, since the equalization of the SOC is carried out during parking/stopping so that the SOC of the other storage batteries is adjusted to the SOC of the storage battery having the lowest SOC, the SOC of the storage batteries as a whole is lowered radically On the other hand, in the battery assembly system according to this embodiment, since the SOC of the other storage batteries is adjusted to the SOC of the storage battery having a median SOC, the SOC can be equalized safely and efficiently even during parking/stopping. Furthermore, during parking/stopping, the total voltage of the battery assembly is monitored, it is possible to prevent the SOC of the entire battery assembly from shifting to the SOC that is lower than the limited value.

In the battery assembly system according to this embodiment, the charging/discharging current value is set to ¹⁄₂₀₀C. This is about one-fourth as compared with that in the prior art. As mentioned above, the variations of the SOC that are locally generated like this may be caused by a micro short-circuited battery in most cases. With respect to the variations of the SOC generated locally like this, it is advantageous in the battery assembly system according to this embodiment rather than the prior art because it is possible to charge the specific storage battery intensively. The battery assembly system according to this embodiment can be provided at a lower charging/discharging current. Furthermore, by predominantly charging the micro short-circuited battery in which the SOC is reduced radically, the variations of the SOC can be compressed for a shorter time.

Furthermore, if the quantity of charged/discharged electricity is recorded in the deterioration detector for each storage battery, it is possible to detect the deteriorated storage battery. In this case, in order to record the quantity of the charged/discharged electricity, a constant-current circuit can be provided, thus facilitating the management of the quantity of charged/discharged electricity.

Furthermore, in the battery assembly system according to this embodiment, the terminal voltage of the storage battery is detected, and the SOC is equalized by charging/discharging, thereafter the terminal voltage of the storage battery is detected again by providing a pause period. Therefore, it is not necessary to repeat switching ON/OFF by polarization as in the prior art. Thus, it is possible to equalize the SOC in a short time.

Furthermore, in the battery assembly system according to this embodiment, by recording the elapsed time until the variations of the SOC exceed 5% and detecting the elapsed time until the variations of the SOC exceed 5% is reduced, it is possible to judge whether the storage battery is deteriorated. The numeral value of the quantity of charged/discharged electricity or the running distance may be used as a criterion for judging that the storage battery is deteriorated.

The following Table 1 shows the relationship among the number of equalization, elapsed time until the variations of the SOC exceed 5%, running distance, and quantity of charged/discharged electricity. In the conventional battery assembly system, a user does not notice the deterioration of the storage battery until a problem occurs during running (number of equalization: 26). However, in the battery assembly system according to this embodiment system, it is possible to detect the deterioration of the storage battery about three months before a problem occurs during running (number of equalization: 23).

TABLE 1

| Number of equalization | Elapsed time (h) | Running distance (km) | Quantity of charged/discharged electricity (Ah) |
| --- | --- | --- | --- |
| 1  | 2300 | 3000 | 290 |
| 2  | 2350 | 2900 | 300 |
| 20 | 2200 | 2500 | 240 |
| 21 | 1800 | 2000 | 190 |
| 22 | 1600 | 1900 | 200 |
| 23 | 1200 | 1300 | 120 |
| 24 | 600  | 800  | 70  |
| 25 | 200  | 300  | 20  |
| 26 | 10   | 10   | 2   |

Furthermore, as in the battery assembly system of this embodiment, if the charging/discharging current is set to about 50 milli ampere (mA), the charging/discharging circuit can share the multiplexer with the voltage detection circuit. Therefore, it is possible to configure a battery assembly system with a simple circuit configuration.

As mentioned above, according to this embodiment, at least one storage battery among a plurality of storage batteries is charged or discharged so that the SOC of the storage batteries calculated respectively by the SOC calculator 2 is equalized. Therefore, it is possible to equalize the SOC of the storage batteries by a single charging/discharging unit 1. As a result, it is possible to equalize the SOC of each storage battery with an inexpensive and simple configuration.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A battery assembly system comprising:
   a battery assembly comprising a plurality of storage batteries connected in series,
   a voltage detector for detecting respective voltages generated in the storage batteries constituting the battery assembly,
   a current detector for detecting a current flowing in the plurality of storage batteries,
   a state-of-charge (SOC) calculator for calculating the state of charge (SOC) of the storage batteries, based on the voltages detected by the voltage detectors, respectively and the current detected by the current detector,
   a charging/discharging unit for charging or discharging one of the plurality of storage batteries so as to equalize the SOC of the storage batteries calculated by the SOC calculator, respectively, and
   a deviation judging unit for judging whether a maximum value of the deviation of the SOC of each storage battery calculated by the SOC calculator exceeds a predetermined value,
   wherein the charging/discharging unit is capable of being connected selectively to each of the plurality of storage batteries, and
   when the deviation judging unit judges that the maximum value of the deviation of the SOC of each storage battery exceeds the predetermined value, the charging/discharging unit charges or discharges at least one of the plurality of storage batteries.

2. The battery assembly system according to claim 1, wherein the charging/discharging unit charges or discharges a storage battery in which the deviation of the SOC exceeds the predetermined value.

3. The battery assembly system according to claim 1, wherein the charging/discharging unit charges a storage battery in which the deviation of the SOC is deviated to the negative side and discharges a storage battery in which the deviation of the SOC is deviated to the positive side.

4. The battery assembly system according to claim 1, wherein the predetermined value is 5%.

5. The battery assembly system according to claim 1, wherein the deviation is a deviation with respect to the median value of the SOC of the plurality of storage batteries.

6. The battery assembly system according to claim 1, wherein the charging/discharging unit has $\frac{1}{100}C$ to $\frac{1}{10000}C$ of charging/discharging capability with respect to a capacity of the battery assembly.

7. A battery assembly system comprising:
   a battery assembly comprising a plurality of storage batteries connected in series,
   a voltage detector for detecting respective voltages generated in the storage batteries constituting the battery assembly,
   a current detector for detecting a current flowing in the plurality of storage batteries,
   a state-of-charge (SOC) calculator for calculating the state of charge (SOC) of the storage batteries, based on the voltages detected by the voltage detectors, respectively and the current detected by the current detector,
   a charging/discharging unit for charging or discharging one of the plurality of storage batteries so as to equalize the SOC of the storage batteries calculated by the SOC calculator, respectively, and
   a deterioration detector for detecting a storage battery with deteriorated performance among the plurality of storage batteries, wherein the charging/discharging unit is capable of being connected selectively to each of the plurality of storage batteries.

8. The battery assembly system according to claim 7, wherein the deterioration detector detects the deteriorated storage battery based on the quantity of charged/discharged electricity that is an accumulation of the quantity of electricity for each storage battery being charged or discharged.

9. The battery assembly system according to claim 8, wherein the deterioration detector detects the deteriorated storage battery based on an elapsed time until the deviation of the SOC exceeds the predetermined value.

* * * * *